United States Patent [19]
Sheppard

[11] 3,916,730
[45] Nov. 4, 1975

[54] SWITCHABLE RATIO STEERING SYSTEM
[76] Inventor: Richard H. Sheppard, c/o R. H. Sheppard Co., Inc., Hanover, Pa. 17331
[22] Filed: Dec. 27, 1973
[21] Appl. No.: 428,728

[52] U.S. Cl.................. 74/751; 74/388 PS; 74/685; 180/79.2 R
[51] Int. Cl.² ........................ F16H 3/74; B62D 5/06
[58] Field of Search ........ 74/388 PS, 751, 626, 785; 180/79.2 R

[56] References Cited
UNITED STATES PATENTS

| | | | |
|---|---|---|---|
| 2,331,684 | 10/1943 | Henningsen | 74/785 |
| 2,583,556 | 1/1952 | Fleischel | 74/785 |
| 2,968,189 | 1/1961 | Wolko | 74/388 PS |
| 3,241,630 | 3/1966 | Snabes et al. | 74/751 |

Primary Examiner—Samuel Scott
Assistant Examiner—John Reep
Attorney, Agent, or Firm—Lowe, King & Price

[57] ABSTRACT

An emergency system for automatically increasing the steering ratio of vehicle steering to provide increased mechanical advantage in the event of power steering hydraulic pressure loss including a planetary gear coupling interposed between the vehicle steering column and the power steering unit. A sun gear of the planetary gear set is directly coupled to the vehicle steering column and a carrier of planet gears is directly coupled to the power steering unit. A ring gear of the planetary set is a part of a piston and slides for engaging one of two different clutches in response to the status of power steering pump pressure. In the power steering mode, one clutch locks the planetary set to rotate as a unit yielding a normal 1:1 coupling between the steering column and the power steering unit. In response to a loss of power steering pump pressure, the ring gear slides to engage the second clutch which locks the ring gear to the housing. This provides a 4:1 mechanical advantage through reduced rate of rotation of the carrier. More specifically, the sun gear drives the planet gears around the inside of the stationary ring gear, thereby rotatably moving the carrier, which, in turn, drives the input shaft to the steering unit with the desired mechanical advantage.

13 Claims, 5 Drawing Figures

SWITCHABLE RATIO STEERING SYSTEM

FIELD OF THE INVENTION

The present invention relates to a new and improved vehicle power steering system, and in particular, to a system having a switchable ratio coupling interposed between a steering column and a power steering unit.

BACKGROUND OF THE INVENTION

In all present day integral power steering units for motor vehicles, "lost motion" spring means is employed within the unit to provide a mechanical coupling between the steering wheel rotated command shaft and the wheel linkage actuating power shaft in the event of the failure of the hydraulic pressure. Despite the existence of this back-up system, the sudden loss of power steering pump pressure especially on large vehicles, such as occasioned by the engine stalling or by a hydraulic failure, has been proven to be the cause of many accidents. Particularly for tandem axle trucks and off-the-road vehicles, a large and often prohibitive torque must be exerted upon the steering wheel to manually steer the vehicle at the steering ratio employed during the power steering mode of operation.

Several suggestions have been made in the past to alleviate this problem. One prior art U.S. Pat., Dye et al No. 2,796,945, discloses a standby parallel coupling to the steering linkage for automatically completely by-passing the cylinder-type power steering system in the event of hydraulic failure. Such a system wherein there are separate parts, namely, a steering assist cylinder, an emergency gear coupling and a steering gear, involves considerable expense in manufacturing costs. In addition, the system requires a substantial amount of space to integrate into existing engine components where accessory space is already at a premium.

Another quite different approach is to provide a system with redundancy in the hydraulic systems so that upon failure of one sub-system, one-half power steering is still available. Such an approach is preferred since there is no change in rotational speed of the steering wheel and essentially no change in the feel under normal conditions. This system is shown in my previous application entitled "Dual Hydraulic Power Steering System," Ser. No. 236,410, filed Mar. 20, 1972, now U.S. Pat. No. 3,826,328, issued July 30, 1974. However, cost and space are again factors so that a need for a simple, compact gear-type torque multiplying unit that can be easily added on to existing integral power steering units for emergency activation is identified.

OBJECTS OF THE PRESENT INVENTION

Thus, it is an object of the present invention to provide a relatively low cost, compact means for automatically increasing steering ratio in the event of power steering failure which is easily integrated into conventional power steering systems.

It is a further and broader object of the present invention to provide a new and improved coupling between a steering wheel and the power steering command shaft having a switchable ratio.

It is yet another object of the present invention to provide a new and improved switchable ratio power transmission between a steering command shaft and a power steering unit command which is automatically switched in response to the status of power steering pump pressure.

SUMMARY OF THE INVENTION

The power steering system of the present invention includes a switchable ratio power transmission coupling interposed between the vehicle steering wheel column and the command or input shaft of a power steering unit of the integral type. The power transmission coupling, which is switched in ratio in response to the status of power steering pressure, comprises a planetary gear system mounted within a bore of a housing, which may be readily attached in piggy-back fashion on existing integral power steering gears. The planetary gear system includes a sun gear, internally toothed ring gear coaxially and in spaced relationship surrounding the sun gear, and a plurality of planetary gears in meshing relationship with both the sun and ring gears. The planet gears are rotatably mounted on a carrier or spider member which is coaxial with the sun and ring gears.

In the overall power steering system, the vehicle steering wheel column is connected for rotating the sun gear and the power steering unit command shaft is connected to be rotated by the carrier. The ring gear is an axially slidable piston which is actuated between two detent determined axial positions by selectively pressurizing a piston chamber defined by the ring gear and the housing bore. This selective pressurization is responsive to the status of power steering pump pressure. In each of the two positions, the ring gear is engaged by a different clutch member. In a normal position, corresponding to proper high power steering pump pressure, the ring gear is clutched to the carrier of the planetary system so that the sun gear, carrier and ring gear rotate as a single unit. When the power steering pump pressure falls below a predetermined level, the ring slides to the emergency position wherein the ring gear is freed of the carrier, and instead clutched to the housing. Now, the planet gears are free to roll around the inside of the ring gear resulting in a rotation of the carrier through movement of the planet gear support axles. As a result, the carrier and thus the steering gear command shaft to which it is attached, rotates at a lesser speed than the sun gear but at the desired increased mechanical advantage.

Two main embodiments of the apparatus of the invention are disclosed. In one embodiment, the piston chamber is pressurized by the same hydraulic pump source that powers the steering gear unit. In the other embodiment, the piston chamber is pressurized by a separate pressure source, such as an air compressor. In both embodiments, a grooved spool valve means operated in response to the power steering pressure, controls the pressurization of the piston chamber by variably coupling the piston chamber to the pressure source. In the embodiment where a separate pressure source is utilized, the spool means comprises a pressure amplifier while in the embodiment utilizing just the power steering pump source, the spool valve means functions as a type of pressure regulator for overcoming any small leakage from the piston chamber.

Other features and objects of the present invention will become apparent upon a perusal of the following detailed description of the preferred embodiments in conjunction with the appended drawings.

DETAILED DESCRIPTION OF THE PREFERRED EMBODIMENTS

Figure 1:
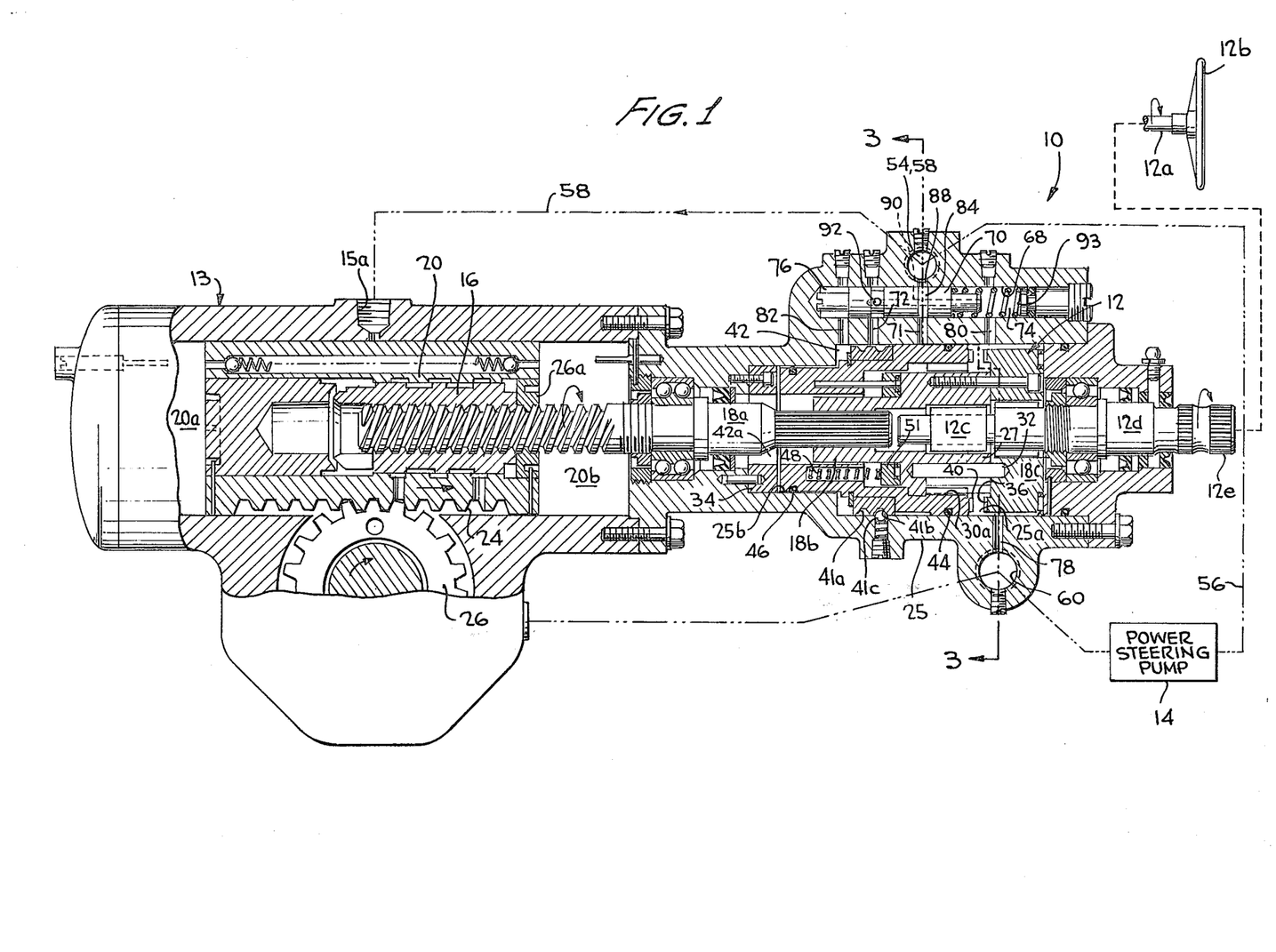
FIG. 1 is a central horizontal sectional view of the power steering system of the present invention includ

Referring to FIG. 1, a switchable transmission or coupling 10 responsive solely to power steering pump hydraulic pressure source 14 is interposed between a vehicle steering column 12a which is manually rotated by steering wheel 12b and an integral power steering unit 13. Transmission or coupling 10, steering column 12a and power steering unit 13 are all in axial alignment enabling the coupling 10 to be easily integrated into a conventional power steering system.

Power steering unit 13 is preferably of the type disclosed in my prior U.S. Pat. No. 3,092,083 dated June 4, 1963. The power steering unit 13 is hydraulically connected across a power steering pump at an inlet port 15a and an outlet port 15b. Within unit 13 is a spool valve 16 which threadably engages an input steering command shaft 18a for translating the spool valve in response to rotation of command shaft 18a. Spool valve 16 is housed within a central bore in a piston 20, and under normal power operating conditions, piston 20 tends to be translated by hydraulic forces so as to track the translation of spool valve 16. These hydraulic forces are controlled by the distribution of pressurized hydraulic fluid from inlet 15a to a direction dependent one of piston chambers 20a and 20b at the ends of the piston via cooperating annular groove means 22, 22a in the piston 20 and spool valve 16, respectively. Rack teeth 24 on the outside of the piston mesh with a power shaft pinion 26 for rotating the power shaft and consequently actuating the usual steering linkage (not shown) coupled to the vehicle wheels to be steered.

If there is insufficient hydraulic pressure at inlet port 15a, such as due to the stalling of the vehicle engine (which drives pump 14) or some other hydraulic failure, the piston 20 does not track the translation of the spool valve 16. After a limited amount of translation relative to the piston 20, the captured spool valve striking one end of its capturing bore (provided by washer 26a at one end of the bore) moves the piston. The piston 20 is thus directly pushed by the spool valve 16 so as to yield a mechanical coupling between the command shaft 18a and the power shaft.

The coupling 10 is bolted to the input end of the power steering unit 13 which includes the command shaft 18a. The coupling 10 normally directly couples the steering column 12a to command shaft 18a with a 1:1 ratio. In response to a reduction of pressure from power steering pump 14, the coupling 10 switches in ratio, as will be explained below, so that several full rotations of the steering column 12a are required to produce each full rotation of the command shaft 18a.

Thus, as will be seen further below, the direct steering ratio and mechanical advantage are increased responsive to pump pressure failure conditions for enabling continued and emergency steering at feasible torque levels applied to steering wheel 12b.

Figure 3:
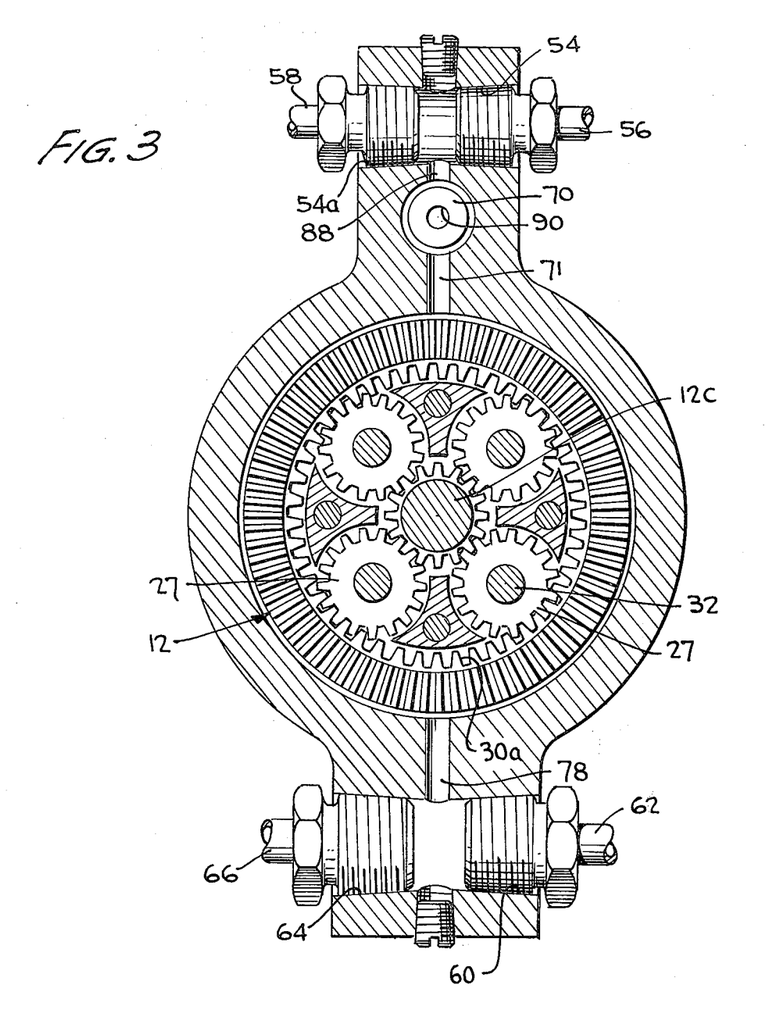
FIG. 3 is an elevational cross-sectional view along the lines 3—3 in FIG. 1.

The coupling 10 thus comprises a planetary gear set 12 (as best shown in FIG. 3) housed within a relatively large diameter bore 25a within the coupling housing 25. The planetary system comprises a plurality of planet gears 27 which are in mesh both with an externally toothed central sun gear 12c, and an internally toothed ring gear 30a, which coaxially surrounds, but is radially spaced from the sun gear. Planet gears 27 are rotatably mounted on axles 32 carried between axially opposed carrier portions 18c and 18b to form a spider. Sun gear 12c is directly rotated by steering wheel 12b since the gear is fixedly attached coaxially to a shaft 12d journaled in one end of the housing 25 and inserted into a bearing supported central bore in carrier portion 18c.

The rotation ratio between steering column 12a and command shaft 18a is controlled by: (1) locking the planetary system to rotate as a unit (1:1 ratio) when power steering is effective; and (2) under emergency conditions, locking the ring gear 30a to the housing 25 to prevent rotation. In the latter situation, when the ring gear 30a is held or grounded against rotation, the planets 27 rotate in response to rotation of gear 12c and move around the inside of the ring gear thereby driving the carrier 18b, 18c through the planet axles 32 and thus causing the command shaft 18a to rotate at a reduced rate, but at a desired 4:1 mechanical advantage. Preferably the sun gear 12c and the planets 27 are of the same diameter to provide the increase in steering ratio by the mentioned factor of 4.

The selective locking of the elements described above is preferably accomplished by providing the ring gear 30a as a part of an axially slidable piston which is retained in one of a pair of operative positions. In the lefthand shifted position (FIG. 1), a grounding brake plate 34, fixedly pinned to housing 25 is engaged, and in a righthand position a lockup clutch plate 36 forming a part of carrier portion 18c is engaged. Left and right ends of the piston 30 are provided with toothed clutch surfaces 38 and 40 for engaging the respective corresponding toothed brake and clutch plates 34 and 36, respectively. The positioning of the piston in the operative positions is aided by a pair of axially spaced detent grooves 41a and 41b carried by piston 30 which are engaged by a spring loaded follower 41c carried by housing 25.

The axial sliding movement is accomplished by the selective pressurization of a generally annular piston chamber 42 defined between the piston 30 and the two ends of the piston. O-rings in retaining grooves 44 and 46 on piston 30 cooperate respectively with the housing bore 25a and a reduced diameter housing bore portion 25b which is coaxial with the bore 25a. When piston chamber 42 in the bore 25a between the O-rings in grooves 44, 46 is not pressurized, the piston 30 is biased to a lefthand extreme postion (see FIG. 1) with the follower 41c in detent 41b and brake 34 engaged by a plurality of angularly spaced compression springs 48. The springs 48 are fitted in longitudinally directed, angularly spaced bores 50 in piston 30 and act against washer member 51, which in turn acts against a shoulder of the carrier portion 18c via a bearing 52.

It can now clearly be seen that a compact, completely self-contained coupling 10 has been provided wherein the shifting from one ratio to the other may be quickly and efficiently effected. The ratio is changed by the controlled shifting of one integral piston and gear 30, 30a of the planetary gear set 12. The integral piston is slidable and rotatable as a whole in the bore 25a. The O-rings 44, 46 form seal means that allow direct high pressure fluid action on at least one side of the integral piston 30 for sliding to the normal power steering mode position (see FIG. 2). The manner in which the coupling 10 is adapted to be positioned in a "piggyback" fashion on the integral power steering gear 13 to maximize the saving of space in the engine compartment of the vehicle can now be more fully realized. The control circuit for the coupling 10 also forms an important part of the present invention and will now be described.

Figure 2:
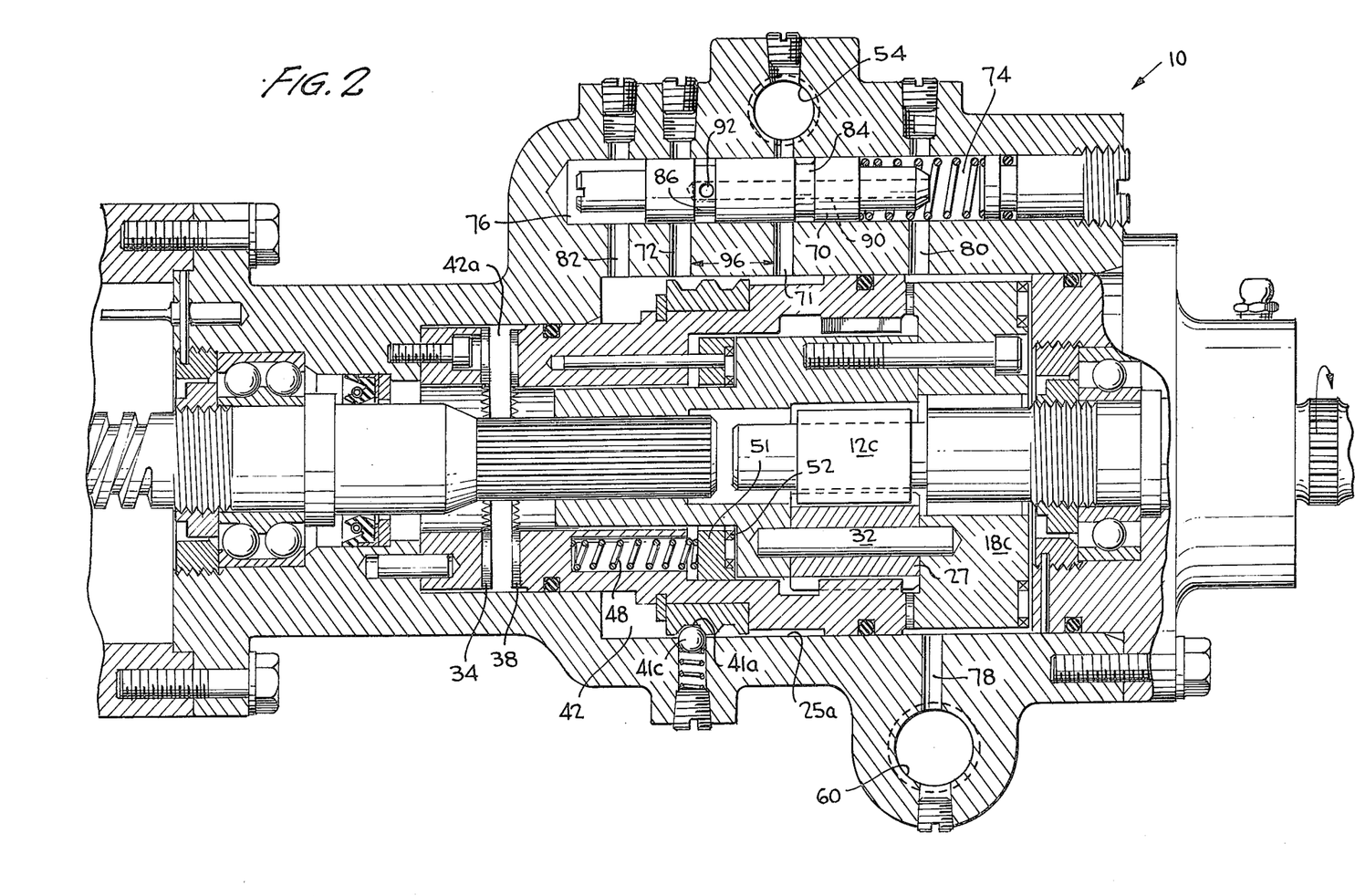
- FIG. 2 is a similar view of the transmission coupling of FIG. 1 but with parts thereof positioned as in a normal power steering mode.

With reference still to FIGS. 1–3, the housing 25 is provided with a first sensor inlet 54 which is hydraulically connected to the high pressure side of power steering pump 14 by pipe 56. The inlet 54 also communicates with a feed through outlet 54a which is connected to the main power inlet 15a of the power steering unit 13 by pipe 58. The housing 25 is also provided on the opposite side with a low pressure hydraulic passage 60 which is connected to the return side of the pump 14 by the pipe 62 and the return port 15b of the power steering unit 13 by the pipe 66.

The housing 25 is also provided with a secondary bore 68 which is radially offset from bore 25a. A spool valve 70 slides within bore 68 for controlling the pressurization and exhaust of piston chamber 42 via a pair of axially spaced transversely bored passageways 71 and 72, said passageways providing direct communication between said piston chamber 42 and high pressure fluid. Two opposed piston chambers 74 and 76 are defined at the ends of the spool valve 70. Chamber 74 communicates with outlet 60 (across the bore 25a) via a transverse passageway 78 on the other side. The internal chamber 42a adjacent the lefthand end of the piston 30 (see FIGS. 1 and 2) is constantly exhausted through the interior of said piston 30 and through the meshing gears of the gear set 12 and out the passageway 78. Chamber 76 communicates with the piston chamber 42 via a transverse passageway 82.

In operation of the control circuit, the differential pressure between chamber 76 and 74 translates the spool valve 70 and thereby variably aligns a pressurization groove 84 and a vent groove 86 with the respective passages 71 and 72. This permits the selective pressurizing and venting of the piston chamber 42. For pressurizing, the spool valve 70 is located so that groove 84 provides communication between passage 71 and interconnecting passageway 88. This, in essence, connects the first inlet 54 through the spool valve bore 68 to the operating chamber 42. For venting piston chamber 42, spool valve 70 is located so that vent groove 86 partially overlaps passageway 72.

A central bore 90 in spool valve 70 establishes communication of high pressure fluid to the chamber 74 through radial bore 92 in vent groove 86. By translating the spool valve 70 so that vent groove 86 is in line with passageway 72, the piston chamber 42 is ultimately communicated with the outlet 60.

The axial spacing 94 between the grooves 84 and 86 is less than the axial spacing 96 between the corresponding passageways 71 and 72 by a distance X. For a small displacement of the spool 70 to the left of a rightmost position, by a distance less than X, pressurization groove 84 may slightly communicate with passageway 71 without vent groove 86 communicating with passageway 72. This condition is maintained during normal power steering operation to assure that constant high pressure fluid fills the chamber 42 without a chance of inadvertent blow down or exhaust occurring. When pump pressure does fail and manual operation is to be established, the spring 93 urges the valve 70 to the left (see FIG. 1), a small amount of backflow of fluid occurs through groove 84 and into the pipe 58. The backflow is gauged to be sufficient to allow movement of the valve 70 at least over the distance X whereupon the groove 86 is communicative with passageway 72 and full exhaust occurs through bore 90, passageway 80, across the bore 25a and out passageway 78.

Thus, in the overall operation of the transmission coupling assuming normal hydraulic pump pressure conditions, as illustrated in FIG. 2, the spool valve 70 is biased to the right against the force of compression spring 93 by the high pressure fluid in chamber 42, passageway 82 and chamber 76. The chamber 74, passageway 80 and chamber 42a are in a low pressure condition via the passageway 78 and the outlet 60. When the piston chamber 42 is thus properly pressurized, with a predetermined hydraulic pressure sufficient to oppose the force of compression springs 48, the piston 30 is maintained in engagement with the lockup clutch 36, and the same pressure is acting in chamber 76 to maintain the spool valve in position.

If the pressure in piston chamber 42 drops slightly, the hydraulic force exerted in chamber 76 is lowered slightly and the spool valve slides slightly to the left by a distance less than X so as to bring the pressurizing groove 84 slightly in communication with the passageways 71 and 88. At that point, the piston chamber 42 receives more fluid which also increases the pressure in chamber 76. That increased pressure moves the spool valve 70 back to the right a sufficient amount to again isolate piston chamber 42. Thus, it is apparent that one function of spool valve 70 is to regulate and maintain constant the pressure in piston chamber 42. Furthermore, the detent mechanism 41 assists in assuring that the piston 30 does not move in response to a false signal generated by momentary pressure variations.

The spool valve 70 is constantly biased toward a leftmost position by the compression spring 93 acting axially between a shoulder on the spool valve and a plug at the right-hand end of the bore 68. In the leftmost position (FIG. 1) both the groove 84 and 86 are in communication with the respective passages 71 and 72. Should the power steering pump 14 fail to deliver pressure, then the pressure in the chamber 74, which communicates with the return side of the pump, rises. Due to the rise of pressure and the backflow of fluid on the high pressure side through passageway 71 and pipe 58, there is insufficient force to maintain the spool in the righthand position of FIG. 2 and it is moved to the left more than distance X whereupon the vent groove 86 can communicate with passageway 72. At that point, the pressure of the piston chamber 42 and the chamber 76 is further reduced by direct outflow of fluid, as explained above, and the spool valve 70 moves all the way to the left stopping at a lefthand end of the bore 68 as shown in FIG. 1. At that position, both passageways 71 and 72 communicate with the respective grooves 84 and 86. At the same time the springs 48 push the piston 30 into engagement with lockup clutch 34 providing the increased steering ratio.

Should the pump pressure return, the piston chamber 42 again receives pressurizing fluid via groove 84. The pressurizing fluid also flows from piston chamber 42 back to chamber 74 via groove 86, orifice 92 and bore 90, tending to shunt the differential pressure driving the spool 70. However, the bores 90 and 92 are chosen sufficiently small in diameter to provide sufficient resistance to permit a properly operating power steering pump 14 to establish the necessary differential pressure to move the spool to the right sufficiently so that the vent groove 86 no longer communicates with passageway 72. Thereafter, the spool 70 acts as a regulator maintaining pressurization of piston chamber 42 as previously explained. When the piston chamber 42 is under the full hydraulic pressure, the piston 30 is maintained in the righthand position of FIG. 2 against the force of springs 48 for the normal 1:1 steering ratio.

Figure 4:
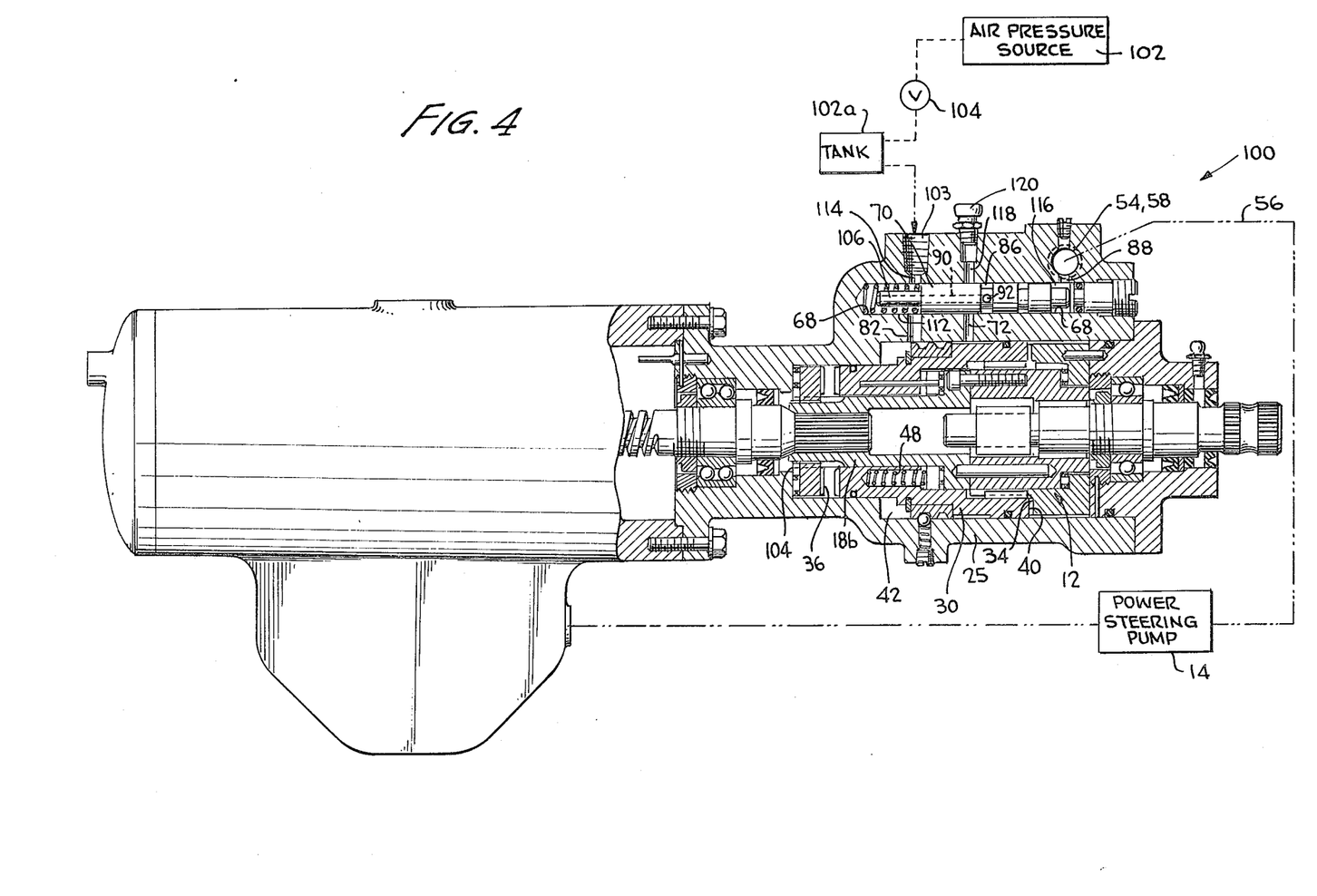
FIG. 4 is a central horizontal sectional view similar to FIG. 1 showing an alternate embodiment of a coupling in the emergency manual steering mode.
Figure 5:
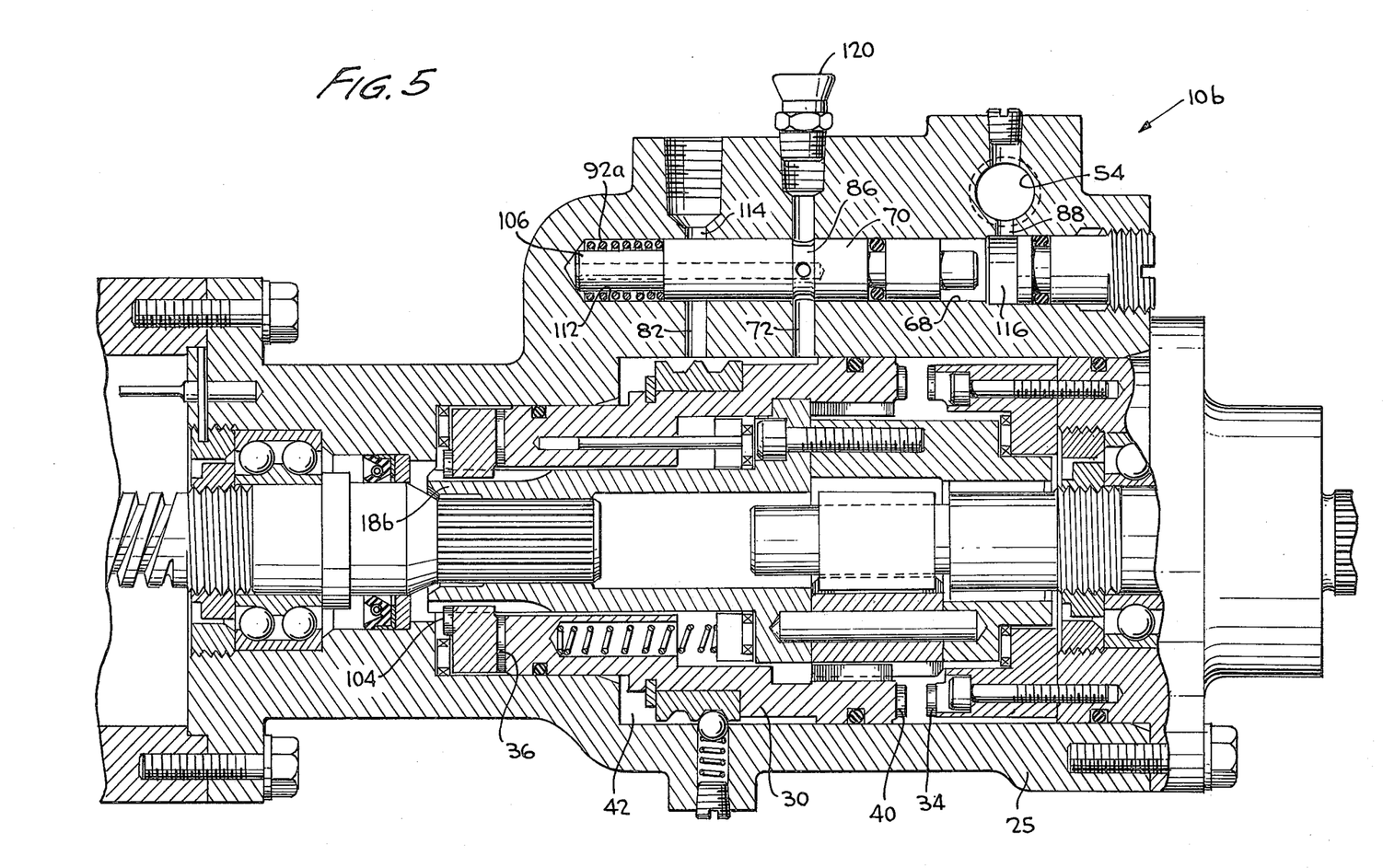
FIG. 5 is a view similar to FIG. 2 showing the alternate embodiment coupling of FIG. 4 in the normal power steering mode.

The alternate embodiment coupling transmission 100, illustrated in FIGS. 4 and 5, is used in conjunction with a separate pressure source 102, such as an air compressor commonly available on truck vehicles. The source 102 and storage tank 102a are connected to housing 25 via inlet 103. In this embodiment, the spool valve 70 operates as a type of inverting pressure amplifier for selectively supplying air pressure to the piston chamber 42 from the inlet 103. In response to the positive hydraulic pressure at an inlet 54 falling below a predetermined level, the valve 70 shifts to the FIG. 4 position thereby establishing the manual steering mode.

The embodiment 100 further differs from the embodiment 10 in that the lockup clutch plate 36 is at the left side of housing 25 and the holding or grounding brake plate 34 is at the right side. Thus, when piston chamber 42 is supplied with air pressure from source 102, which moves the piston 30 to the right against the force of compression springs 48, grounding brake 34 is engaged by piston clutch surface 40 thereby providing the increased steering ratio.

Conversely, in response to proper hydraulic pressure at inlet 54, the piston chamber 42 is not pressurized, and the piston 30 engages the lockup clutch 36 at the left side of housing 25, as shown in FIG. 5. Annular lockup clutch plate 36 is keyed to carrier portion 18b via splined connection 104 and grounding brake plate 34 is fixedly secured to housing 25.

Spool valve 70 is provided with a reduced diameter end portion 106 about which a compression spring 92a is located. The spring 92a acts between the lefthand end of bore 68 and a shoulder defined at the start of the reduced diameter portion 106. The shoulder defines an annular gap 112 around the spool valve end which is selectively put in register with both passageway 114 from inlet 103 and a passageway 82 communicating with the piston chamber 42.

In operation, high pressure fluid from pump 14 communicating with a chamber 116 at the righthand end of spool valve 70 from inlet 54 via a transverse passageway 88, pushes the spool valve 70 to the left against the force of spring 92a to the point where spool portion 106 is stopped. At that position (see FIG. 5), the annular gap 112 is not in communication with the passageways 82 and 114. Instead the vent groove 86 carried by the spool 70 provides communication between a transverse passageway 118 connecting the chamber 42 to a vent 120 to ambient air pressure. The spool valve 70 is also provided with a central bore 90 communicating between the lefthand end of spool valve 70 and the vent groove 86 via a radially bored hole 92 at the vent groove. Bores 90 and 92 provide a path for venting the annular gap 112 so that the spool valve does not encounter air pressure resistance in being moved to the leftmost position illustrated in FIG. 5.

Upon a failure of power steering pump pressure, the spool valve 70 is urged by the spring 92a into the righthand position of FIG. 1 wherein the left end of the spool valve is stopped against a plug retained in the bore 68. As a consequence, the annular gap 112 communicates with piston chamber 42 which is pressurized with air pressure causing the grounding brake plate 34 to be engaged by the mating end 40 of the piston 30.

When hydraulic pressure returns to inlet 54, the spool valve 70 shifts to the left by overriding the air pressure to a position where the piston chamber 42 is vented to atmospheric pressure via groove 86. The chamber 42 is exhausted via the vent 120 and the springs 48 shift the piston 30 to engage the clutch 36 once again for 1:1 ratio operation. The detent assembly 41, as in the first embodiment, aids in assuring proper positioning and holding in position of the piston 30.

As should be apparent only static air pressure is needed to maintain the transmission coupling 110 in the emergency high steering ratio mode. Therefore the tank 102a, which is charged by the pressure source 102 via a check valve 104, is provided as a further failsafe feature of the system of the invention.

Having described preferred embodiments of my invention it should be clear that many variations and modifications can be made with the scope and purpose of my invention. It is therefore intended that these preferred embodiments be viewed as illustrative of the principles of my invention and not in a limiting sense.

What is claimed is:

1. In a vehicle steering system including a rotatable steering command shaft and power steering unit powered by a hydraulic pump source, said power steering unit including a rotatable input shaft, a coupling between said steering command shaft and said power steering unit, said coupling being characterized by a first steering ratio mode for manual emergency steering operation and a second mode for power operation, said coupling comprising a housing having a bore; a planetary gear set including at least three coaxial interacting gear means mounted within said bore and comprising central sun gear means, ring gear means coaxially surrounding the sun gear means and planet gear means disposed in meshing relationship with said sun gear and ring gear means, first and second ones of said three gear means being respectively connected to the steering command shaft and to said input shaft; brake means for holding a third one of said gear means to establish the first steering ratio mode; and clutch means for relatively locking together the three gear train means for rotation as a unit to establish the second steering ratio mode; and shift means responsive to the pressure generated by said pump source to cause engagement of a selected one of said brake and clutch means, said first steering ratio being greater than said second steering ratio to allow easier turning of said command shaft in emergency situations upon loss of hydraulic pressure, said shift means including means for axially sliding said third one of said gear means with said bore between two positions for engaging the brake means in a first position and engaging the clutch means in the second position, said third gear means being a ring gear and forming an integral piston slidable and rotatable as a whole in a chamber formed by said bore, seal means on said integral piston to allow direct high pressure fluid action on at least one side of the integral piston for sliding.

2. The coupling of claim 1 wherein the sliding means further comprises means for selectively pressurizing said chamber, bias spring means coupled to said ring gear means in force opposition to said pressurizing means and detent means for assisting in holding said ring gear in position.

3. The coupling of claim 1 wherein said first and second ones of said gear means are said sun gear means and said planet gear means, respectively.

4. The coupling of claim 2 wherein said means for selectively pressurizing comprises spool valve means responsive to said hydraulic pump source.

5. The coupling of claim 2 wherein said housing has a low pressure port for connection to the suction side of said pump source, said housing having a second hydraulic bore, a first passageway communicating between said chamber and said second bore, a second passageway communicating between said second bore and a high pressure port of said pressurizing means, and spool valve means within said second bore selectively coupling said first and second passageways for regulating the pressure in said chamber.

6. The coupling of claim 5 wherein is further provided bias spring means urging the spool valve means in a first direction, and wherein said second bore is coupled to said ports in a manner for urging the spool valve means in a second direction opposite the first direction, and groove means on said spool for selectively coupling said first and second passageways upon urging of the spool in the first direction.

7. The coupling of claim 6 wherein said spool valve means has two ends, said spool valve means and second bore defining a pair of spool piston chambers at the ends, in combination with a third passageway communicating between the first mentioned chamber and a first of said spool piston chambers.

8. The coupling of claim 7 wherein said housing has a fourth passageway communicating between said low pressure port and a second of said spool piston chambers.

9. The coupling of claim 8 wherein is provided means carried by said spool for selectively coupling said chamber to the second of said spool piston chambers via said first passageway in response to the difference in pressures between said first and second spool piston chambers.

10. The coupling of claim 9 wherein said means for selectively coupling said first mentioned chamber to the second of said spool piston chambers includes said groove means on said spool and bore means in said spool communicating between said groove means and said second spool piston chamber.

11. The coupling of claim 3 wherein said housing has a first port for connection to said hydraulic pump source and a second port adapted to be connected to a different pressure source, and wherein said housing has a second bore and a first passageway means communicating between said first mentioned chamber and said second bore, and a second passageway communicating between said second port and said bore in combination with spool means slidable within said second bore for selectively coupling said first and second passageways in response to the hydraulic pressure at said first port.

12. The coupling of claim 11 wherein is provided bias spring means uging said spool means in a first direction, and wherein said second bore is coupled to said first port in a manner for urging the spool in a second direction opposite the first direction and groove means on said spool for selectively coupling said first and second passageways upon urging of the spool in the second direction.

13. The coupling of claim 12 wherein said housing has a third port vented to the atmosphere, and wherein said first mentioned chamber communicates with said third port via said groove means to shift said piston to the power steering mode in response to the presence of hydraulic pressure.

* * * * *